United States Patent [19]

Seo

[11] Patent Number: 5,442,814
[45] Date of Patent: Aug. 15, 1995

[54] CELLULAR TELEPHONE FACILITATING A RESPONSE HOLDING STATE

[75] Inventor: Mitsuyo Seo, Tokyo, Japan

[73] Assignee: NEC Corporation, Tokyo, Japan

[21] Appl. No.: 184,036

[22] Filed: Jan. 21, 1994

[30] Foreign Application Priority Data

Jan. 25, 1993 [JP] Japan .................. 5-010258

[51] Int. Cl.⁶ ............................................. H04B 1/38
[52] U.S. Cl. ........................................ 455/89; 455/90; 455/99; 379/59; 379/440
[58] Field of Search ................... 455/89, 90, 99, 33.1; 379/58, 59, 61, 440

[56] References Cited

U.S. PATENT DOCUMENTS

| 5,175,759 | 12/1992 | Metroka et al. | 455/89 |
| 5,327,584 | 7/1994 | Adachi et al. | 455/89 |

FOREIGN PATENT DOCUMENTS

| 3333587 | 4/1985 | Germany . | |
| 0085646 | 5/1983 | Japan | 379/59 |
| 0083438 | 5/1985 | Japan | 379/58 |
| 0287730 | 12/1987 | Japan | 455/89 |
| 63-115440 | 5/1988 | Japan . | |
| 0205637 | 8/1989 | Japan | 379/58 |
| 0065536 | 3/1990 | Japan | 455/89 |
| WO91/07836 | 5/1991 | WIPO . | |

Primary Examiner—Reinhard J. Eisenzopf
Assistant Examiner—Andrew Faile
Attorney, Agent, or Firm—Young & Thompson

[57] ABSTRACT

A foldable cellular telephone has a microphone, a speaker, a foldable telephone main body, a control unit for transmitting/receiving a connection control signal, and an external interface connector connected to an external interface plug, and includes a detecting and notifying section for detecting an open/closed state of the foldable structure and for notifying the control unit of this state, another detecting and notifying section for detecting that the external interface connector is connected to the external interface plug and for notifying the control unit whether the external interface connector is connected, and a setting section, arranged in the control unit, for setting a response holding state when an incoming call is received in a state wherein said external interface plug is connected and the foldable structure is open.

1 Claim, 3 Drawing Sheets

FIG. 2A
FIG. 2B
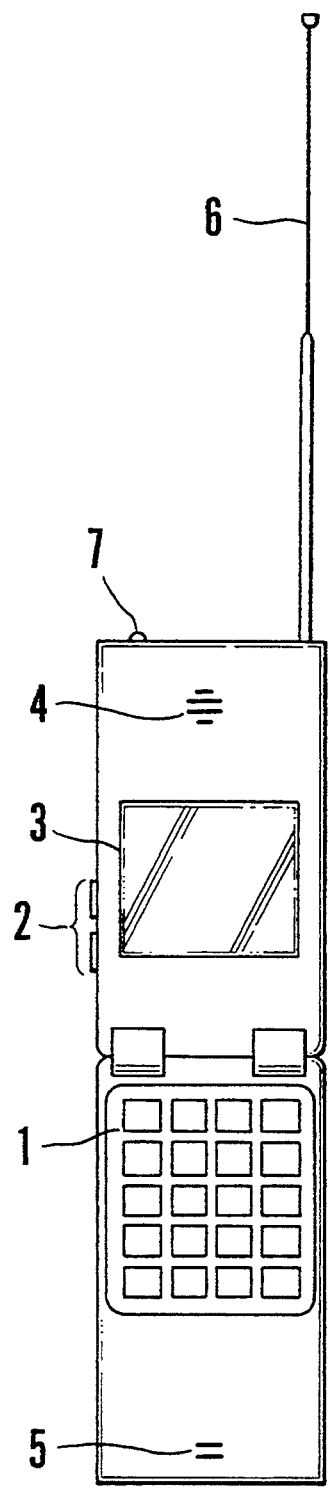
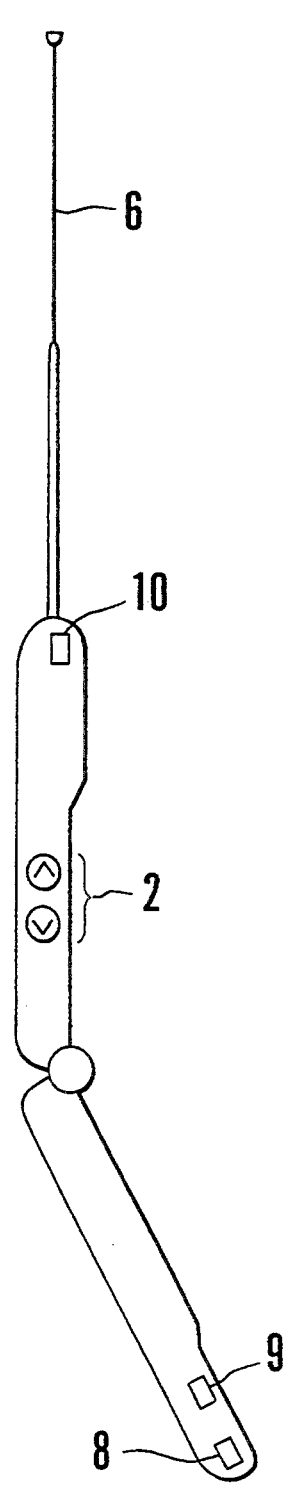

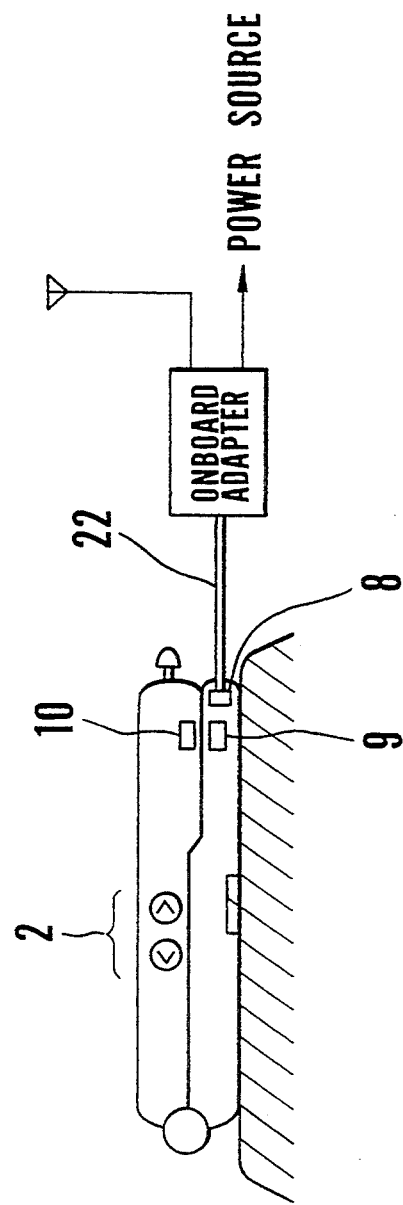

CELLULAR TELEPHONE FACILITATING A RESPONSE HOLDING STATE

BACKGROUND OF THE INVENTION

1. Field of the Invention

The present invention relates to a foldable cellular telephone and, more particularly, to a cellular telephone capable of setting a response holding state only by an opening operation when an incoming call is received in a folded state.

2. Description of the Prior Art

Conventionally, a cellular telephone (mobile phone) to be used in a car has a response holding function of informing a caller, if the incoming call is received when the user himself/herself is busy in driving, that he/she cannot respond to the call. For example, a message, e.g., "I CANNOT RESPOND TO THE CALL NOW" is sent. In many cases, a ten-key switch (including a function key) of the cellular telephone also serves as a response holding switch. For example, an end key is operated during reception of an incoming call to set the response holding state, thereby automatically transmitting a message as described above.

In such a cellular telephone, the ten keys are arranged with small spacings therebetween, so that it is difficult to depress one special key of the ten keys while the user is driving the car. Especially, in a cellular telephone having a foldable structure, when an incoming call is received in a folded state, two operations are required to set the response holding state. That is, the cellular telephone must be first opened, and one special key of the ten keys must be subsequently depressed. Performing these operations while driving can cause safety problems.

SUMMARY OF THE INVENTION

The present invention has been made in consideration of the above situation, and has as its object to provide a cellular telephone capable of setting a response holding state only by an opening operation when an incoming call is received in a folded state.

In order to achieve the above object, according to the first aspect of the present invention, there is provided a foldable cellular telephone capable of setting a response holding state by only performing an operation of opening a telephone main body when an incoming call is received in a folded state.

According to the second aspect of the present invention, there is provided a cellular telephone constituted in a foldable structure and having a transmitter, a receiver, a control unit for transmitting/receiving a connection control signal, and an external interface connector connected to an external interface plug, including means for detecting an open/closed state of the foldable structure and notifying the control unit of this state, means for detecting whether the external interface connector is connected to the external interface plug and notifying the control unit, and means, arranged in the control unit, for setting a response holding state when an incoming call is received in a state wherein the external interface plug is connected and the foldable structure is open.

As is apparent from the above aspects, according to the present invention, when an incoming call is received in a state wherein the external interface connector is connected to the external interface plug, a response holding state is set only by opening the folded telephone main body. At this time, a message, e.g., "I CANNOT RESPOND TO THE CALL NOW. PLEASE HOLD ON" (example) is automatically sent. When the external interface plug is not connected to the external interface connector, a normally carried state is detected to perform a normal operation without automatically setting the response holding state.

Therefore, according to the present invention, when the user is busy driving, a response holding state can be easily set by a simple operation of opening the cellular telephone, thereby ensuring safe driving.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

FIGS. 2A and 2B are schematic front and left side views, respectively, showing an open state of the cellular telephone according to the present invention; and FIG. 3 is a schematic side view showing a folded state of the cellular telephone according to the present invention in a connected state with an onboard adapter.

DETAILED DESCRIPTION OF PREFERRED EMBODIMENT

Figure 1:
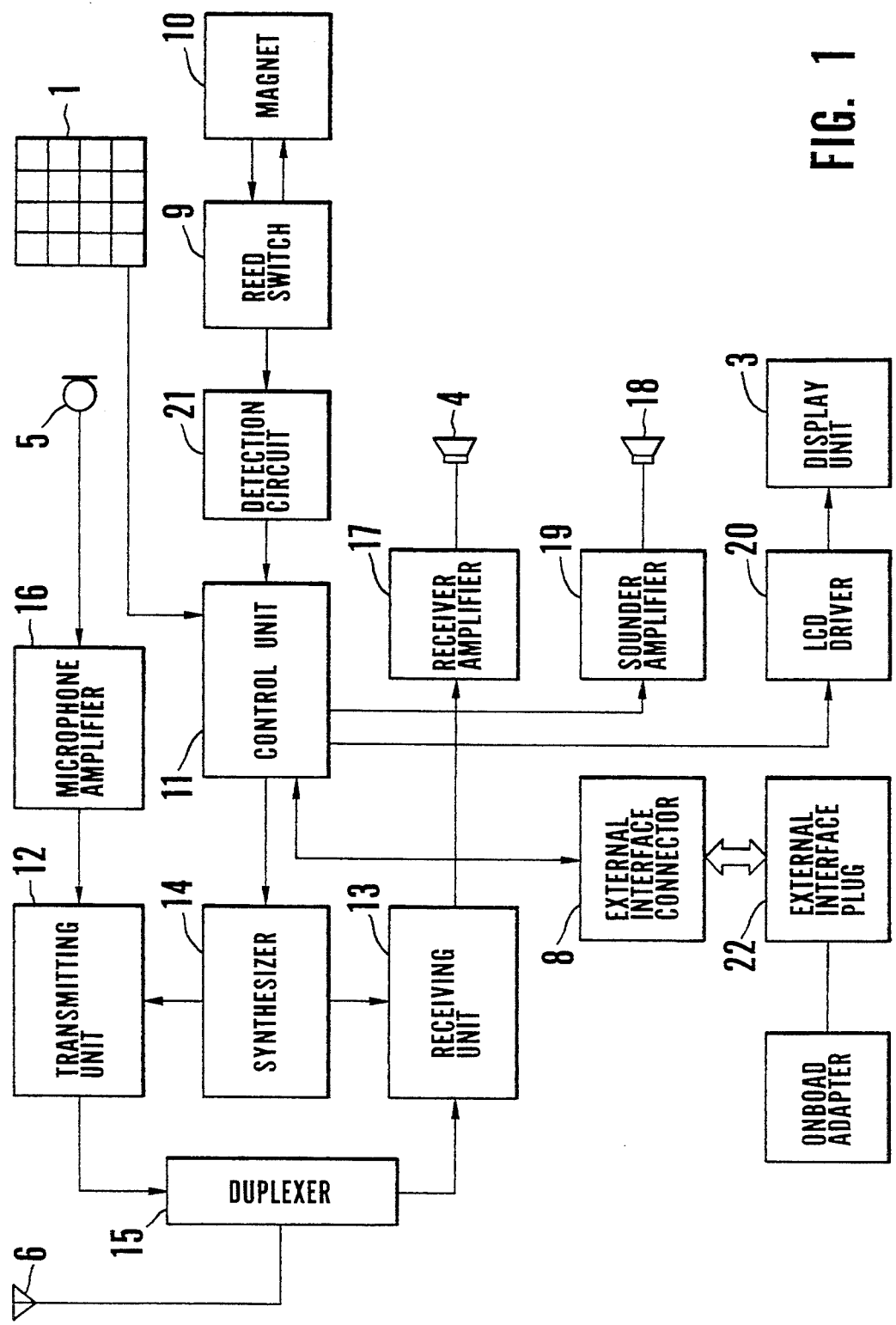
FIG. 1 is a schematic block diagram showing the entire arrangement of a cellular telephone according to an embodiment of the present invention.

A preferred embodiment of the present invention will be described below with reference to the accompanying drawings.

A cellular telephone according to an embodiment of the present invention is connected with an onboard adapter in a folded state, as shown in FIG. 3. As shown in FIG. 1, the entire arrangement has a microphone 5, a speaker 4, an antenna 6, duplexer 15, a transmitting unit 12, a receiving unit 13, a synthesizer 14, a microphone amplifier 16, a ten-key switch 1, a receiver amplifier 17, a sounder amplifier 19, a sounder 18, an LCD driver 20, a display unit 3, an external interface connector 8 connected to an external interface plug 22, and a control unit 11 for transmitting/receiving a connection control signal. As characteristic feature of the present invention, the cellular telephone has a magnet 10, a reed switch 9, and a detection circuit 21 constituting a means for detecting an open/closed state of a foldable structure and means for notifying the control unit 11 of this state, and a means for detecting that the external interface connector 8 is connected to the external interface plug 22 and notifying the control unit 11 of this connection status. The control unit 11 includes a means for setting a response holding state when an incoming call is received in a state wherein the external interface plug 22 is connected and the foldable structure is open.

An operation of the embodiment of the present invention will be described below.

When the cellular telephone is closed, the reed switch 9 comes close to the magnet 10 and is turned on, as shown in FIG. 3. On the other hand, when the cellular telephone is opened, as shown in FIG. 2A, the reed switch 9 is kept away from the magnet 10 and turned off, as shown in FIG. 2B. The ON/OFF state of the reed switch 9 is detected by the detection circuit 21 and transmitted to the control unit 11. Whether the external interface connector 8 is connected to the external interface plug 22 is also transmitted to the control unit 11.

When an incoming call is received in a state wherein the external interface connector 8 is connected to the external interface plug 22, and the control unit 11 recognizes that the cellular telephone is opened during reception of the incoming call, the control unit 11 determines that the telephone is used in a car and starts a response holding sequence to set a response holding state. The cellular telephone sends a message "DRIVING NOW. PLEASE HOLD ON", for example, to the caller. Thereafter, when the user is free to talk and depresses the start key, the synthesizer 14 is operated to set a speech communication state. If the external interface connector 8 is not connected to the external interface plug 22, the control unit 11 recognizes that state and does not set the response holding state even when the above operation is performed. In this case, the control unit 11 sets a state such that a termination response can be immediately performed as a normal cellular telephone.

As described above, when an incoming call is received in a state wherein the external interface connector 8 is connected to the external interface plug 22 of the car, and at the same time, the user is busy in driving, the response holding state can be set by a very simple operation of opening the cellular telephone.

Modifications of the invention herein disclosed will occur to a person skilled in the art and all such modifications are deemed to be within the scope of this invention as defined by the appended claims.

What is claimed is:

1. A foldable cellular telephone having a microphone, a speaker, a foldable telephone main body, a control unit for transmitting/receiving a connection control signal, and an external interface connector connected to an external interface plug, including:

means for detecting an open/closed state of said foldable telephone main body and means for notifying said control unit of said state;

means for detecting that said external interface connector is connected to said external interface plug and means notifying said control unit whether said external interface connector is connected; and means, arranged in said control unit, for setting a response holding state when an incoming call is received in a state wherein said external interface plug is connected to said external interface connector and said foldable telephone main body is opened.

* * * * *